Jan. 20, 1970  M. GREEN  3,490,495
HYDRAULIC SELECTOR VALVES
Filed Feb. 2, 1968
2 Sheets-Sheet 1

United States Patent Office 3,490,495
Patented Jan. 20, 1970

3,490,495
HYDRAULIC SELECTOR VALVES
Martin Green, Birmingham, England, assignor to Girling Limited
Filed Feb. 2, 1968, Ser. No. 702,698
Claims priority, application Great Britain, Mar. 15, 1967, 12,082/67
Int. Cl. F16k *11/14*
U.S. Cl. 137—636.1
4 Claims

ABSTRACT OF THE DISCLOSURE

The invention relates to selector valves for controlling the operation of separate hydraulic systems, in which a valve body is provided with an inlet, a number of outlets, and individual valve members for closing the outlets independently of each other. The valve members are actuated by respective plungers which are movable relative to the valve members and subjected to the pressure prevailing at the inlet in such a manner that when one of the plungers is shifted to close its associated valve member, any subsequent increase in inlet pressure acts to move the plunger away from the valve member, i.e. without re-opening it. The plungers are shifted by means of a control member, such as a rotary cam, which is returned to its normal, neutral position by the pressure actuated movement, described above, of the plunger. The cam is preferably yieldingly retained in its neutral position and its respective operative positions by resilient indexing means.

---

This invention relates to selector valves for controlling the operation of two hydraulic systems in unison or individually, for example in controlling the actuation of the brakes of wheels on opposite sides of a tractor, which brakes are operable individually to assist steering manoeuvres.

The invention provides such a valve which is self cancelling in that it is automatically returned to its neutral condition in response to execution of the last selected manoeuvre. This avoids the possibility of error due to the operator forgetting to return the valve to its neutral condition.

In accordance with the invention there is provided a selector valve for controlling the operation of separate hydraulic systems, comprising a body formed with an inlet and at least two separate outlets, separate valve members associated one with each outlet, separate plungers associated one with each valve member, and a control member movable from a neutral position in which all the outlets are open, to shift a selected one of the said plungers to cause the associated valve member to close the associated outlet, and wherein the selected plunger is movable in response to a subsequent increase in inlet pressure to return the control member to its neutral position without re-opening the valve member.

Further features of the invention will appear from the following description, given by way of example only, of two forms of valve in accordance therewith and shown in the accompanying drawings, in which.

Figure 1:
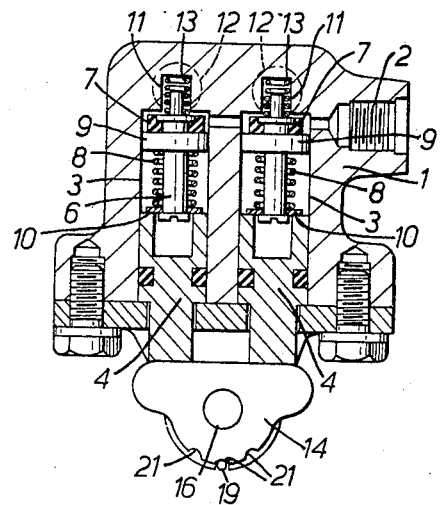
FIGURE 1 is an axial cross-section of one form of valve.
Figure 2:
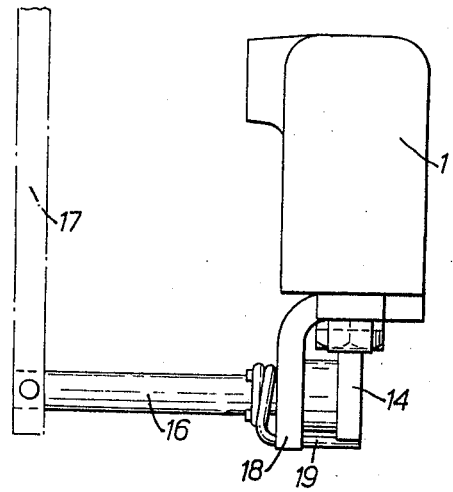
FIGURE 2 is a side elevation.

The valve shown in FIGURES 1 and 2 comprises a body 1 formed with an inlet 2 and a pair of interconnected cylinder bores 3, each containing a plunger 4 and a valve stem 6 carrying a face valve member 7. Each valve stem 6 is surrounded by a coil spring 8 working between a fixed collar 9 and a sliding collar 10 engageable with the adjacent end of the plunger. At the end of each cylinder 3 adjacent the valve member, there is formed an upper cylinder space 11 of reduced diameter communicating with an outlet 12. A light coil spring 13 urges the valve member to its illustrated, open position. The ends of the plungers 4 project through one end wall of the body, into engagement with an operating cam 14 mounted on one end of a shaft 16 and a hand lever 17 is secured to the other end of the shaft, which is journalled in a bracket 18 depending from the body 1. A spring pawl or finger 19 is secured to the bracket for co-operation with notches 21 formed in the periphery of the cam.

In use, the valve is mounted on a convenient part of a vehicle, the inlet 2 is connected to the brake master cylinder and the outlets 12 to the brake slave cylinders on the opposite sides of the vehicle. In the neutral position illustrated, both outlets are in open communication with the inlet, so that the brakes on both sides of the vehicle are available.

To select individual braking, the lever 17 and cam 14 are rotated in one direction, say clockwise in FIGURE 1, thus forcing the left hand plunger 4 inwardly to close the valve member 7 against the end of the cylinder bore 3, and thereby isolating the associated space 11 and outlet 12 from the inlet 2. The brakes are then operated, and fluid under pressure flows through the right-hand outlet. The increased pressure is transmitted to the left-hand cylinder bore 3, so as to press the valve member 7 more firmly against its seating and at the same time force the plunger 4 outwardly, causing it to return the cam shaft and operating lever to their central, neutral position.

When the manoeuvre has been completed and the master cylinder pressure relieved, the left-hand valve member is returned to its illustrated position under the action of the coil spring 13. The valve is accordingly automatically self cancelling, and is always returned to its neutral condition in the course of a manoeuvre.

Figures 3, 4:
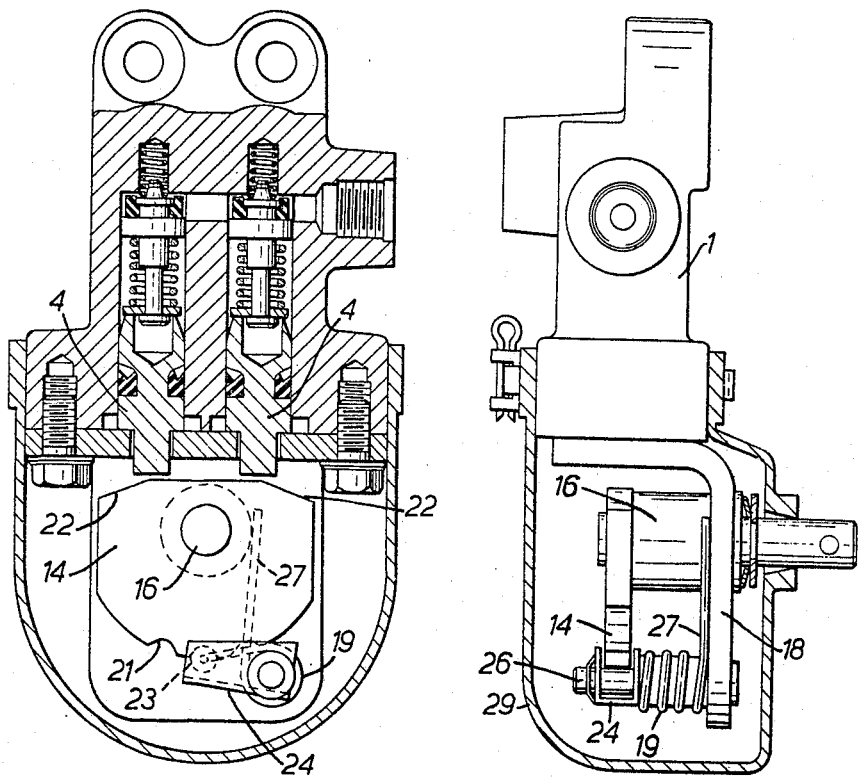
FIGURES 3 and 4 are views, corresponding to FIGURES 1 and 2, of a second form of valve.
Figure 5:
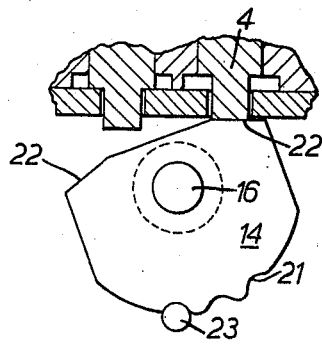
FIGURE 5 shows a part of the valve of FIGURE 3 in a different operative position.

In the second embodiment, shown in FIGURES 3, 4 and 5, the valve is the same, hydraulically, as the valve of FIGURES 1 and 2, but there are some modifications of the mechanical operating arrangement. First, the cam 14 is of modified form, having a pair of flats or lands 22 against which the plunger ends abut when a selection has been made (see FIGURE 5). Secondly, the indexing mechanism in this embodiment comprises a roller 23 housed in a cradle 24 pivotally mounted on a pin 26 carried by the bracket 18. A wire spring 19 has its medial portion spirally wound about the pin 26 and at one of its end portions 27 engaged against shaft 16. The other end portion 28 of the spring has an angled end which forms an axle for the roller 23, parallel with the axis of pin 26. The spring is pre-stressed to bias the roller 23 towards the cam 14. Finally, the operating mechanism is protected by a rubber boot 29.

I claim:

1. A selector valve for controlling the operation of separate hydraulic systems, comprising a body having an inlet and at least two outlets, separate valve members associated one with each said outlet, separate plungers associated one with each said valve member, each said plunger being movable relative to said associated valve member, a control member movable between a neutral position and any one of a plurality of different operative positions, and means for moving said control member from said neutral position to any a selected one of said operative positions to move one only of said plungers and said valve members to close the associated said outlet, said one plunger being movable in a reverse direction in response to an increase in pressure in said inlet to return said control member to said neutral position while said one valve member remains in closed position.

2. A selector valve as claimed in claim 1, wherein said body has a plurality of cylinders, each housing a separate one of said plungers and valve members, and comprising conduit means permanently connecting said cylinder to said inlet, a valve seat at one end of each said cylinder, resilient means urging said valve member away from said valve seat, and further resilient means urging said valve member and said piston away from each other.

3. A selector valve as claimed in claim 1, wherein said control member is constituted by a cam engageable with each of said plungers, and further comprising resilient indexing means for yieldingly retaining said cam in any one of its said positions.

4. A selector valve in accordance with claim 3, wherein said valve has only two outlets, valve members and plungers, said plungers having respective lines of action spaced apart from each other, and said cam is a rotary cam having an axis of rotation transverse to and mid-way between said lines of action, said cam being adapted for partial rottion in opposite directions away from said neutral position to displace said respective plungers.

References Cited
UNITED STATES PATENTS

| | | | |
|---|---|---|---|
| 2,462,544 | 2/1949 | Parker | 137—636.1 X |
| 3,044,495 | 7/1962 | Alfieri | 137—636.1 |
| 3,107,695 | 10/1963 | Broadwell | 137—636.1 |
| 3,128,635 | 4/1964 | Doolittle | 137—636.1 X |
| 3,223,458 | 12/1965 | Valentine | 137—636.1 X |

CLARENCE R. GORDON, Primary Examiner